United States Patent [19]

Petrov

[11] 4,343,175
[45] Aug. 10, 1982

[54] POWER PRESS
[75] Inventor: Alexander S. Petrov, Sofia, Bulgaria
[73] Assignee: Vmei "Lenin" - Centar Po Robotika, Sofia, Bulgaria
[21] Appl. No.: 254,301
[22] Filed: Apr. 15, 1981

Related U.S. Application Data

[63] Continuation of Ser. No. 36,086, May 4, 1979, abandoned.

[30] Foreign Application Priority Data

May 5, 1978 [BG] Bulgaria .................................. 39637

[51] Int. Cl.³ .............................................. B21J 9/18
[52] U.S. Cl. ....................................... 72/452; 72/407; 72/433; 72/437; 83/586; 100/265; 100/291
[58] Field of Search ................ 72/452, 433, 434, 435, 72/436, 431, 407, 450; 74/53; 83/586, 587; 100/265, 291

[56] References Cited
U.S. PATENT DOCUMENTS 2,813,481  11/1957  Hansen .................................. 83/587
2,832,410  4/1958   Soss ...................................... 83/587
3,427,851  2/1969   Michelson ............................. 72/434
3,585,837  6/1971   Bihler ..................................... 74/53

FOREIGN PATENT DOCUMENTS 501532    1/1920   France .................................. 72/433
153194   11/1920   United Kingdom ................. 72/434
1206882   9/1970   United Kingdom .................... 74/53

Primary Examiner—Gene Crosby
Attorney, Agent, or Firm—Karl F. Ross

[57] ABSTRACT

A power press in which low inertia motors with speed control circuitry are connected to a cam which acts upon a lever or cam follower which, in turn, cooperates with a force-storing element which has a spring action and is coupled, e.g. by the same lever, to the tool of the press. Accordingly, in the rotation of the cam, the force-storing means stores potential energy which is transformed into kinetic energy of the ram in another region of the cam at which part of the energy can be delivered to the low inertia motors. Hence the speed control of the motor will, in part, regulate the rate at which the stored force is delivered to the workpiece.

4 Claims, 4 Drawing Figures

U.S. Patent  Aug. 10, 1982  4,343,175
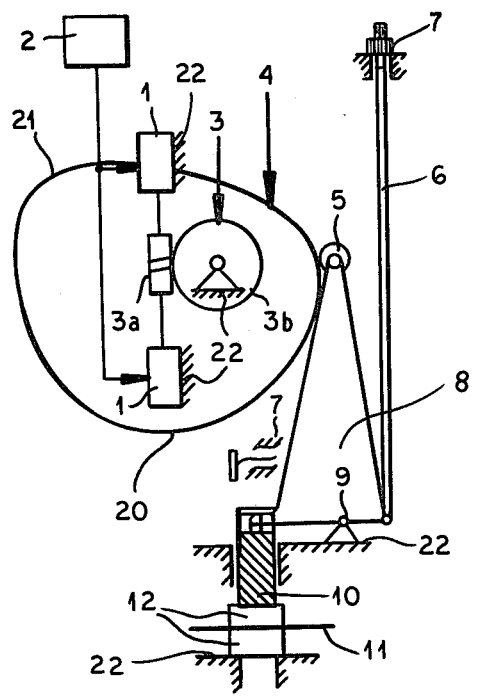
FIG.1
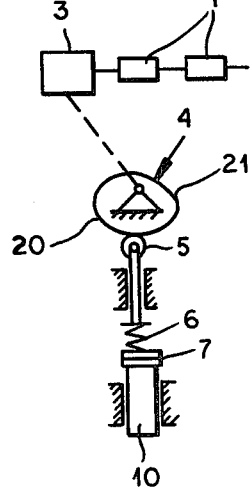
FIG.3
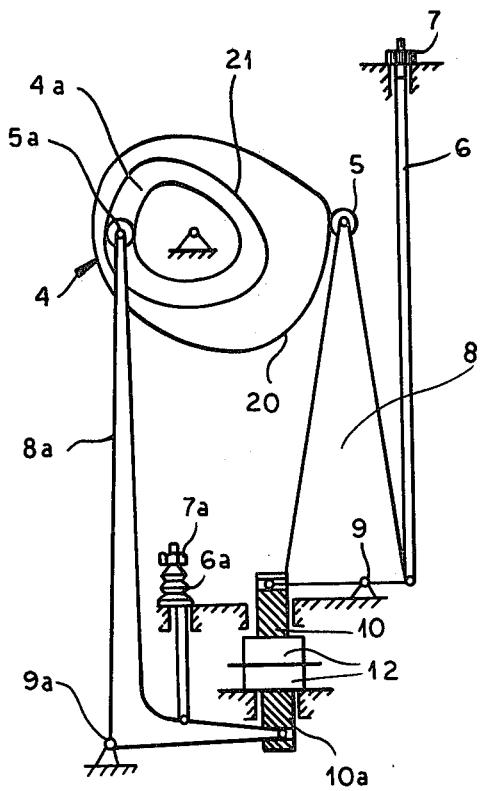
FIG.2
FIG.4

POWER PRESS

This is a continuation of application Ser. No. 036,086, filed May 4, 1979 now abandoned.

FIELD OF THE INVENTION

This invention relates to a power press for working metallic and other materials by plastic deformation, particularly by punching, stamping etc.

BACKGROUND OF THE INVENTION

There are known power presses comprising a flywheel for accumulating kinetic energy in the interval between two blows. On the shaft of this flywheel there is disposed the driving component of a single-revolution clutch, while the driven component of the single-revolution clutch and a brake are fixed to a working shaft. This working shaft is connected to a slide by means of an excentric, a cam or a crank mechanism.

It is a drawback of these presses, that only a part of the energy accumulated by the flywheel is utilized. This energy acts on the workpiece for a very short time within the duration of the cycle in the form of blows; this results in a poor quality of the worked surfaces, while the process of plastic deformation is accompanied by high noise and vibrations. The poor quality of the stamping arises because the sheared surface is only partially smooth, while its greater part is broken and rough, and in the case of sheet material shaping, the material is thinned and even torn.

A further drawback is that, when the working shaft is connected to the slide by means of an excentric or a crank mechanism, the maximum force is obtained at the end of the stroke. This creates a constant danger of jamming of the press and requires a greater spreading of the tools than might otherwise be required by the process, thereby causing an intensive wear as a result of friction and heating, an impaired guiding of the movable parts of the tools, wearing out of their working edges, an increase of their cost and a limitation of the speed and productivity. When the working shaft is connected to the slide by means of a cam mechanism, the press is not versatile, i.e. is suitable only for the working of workpieces for which the cam is profiled and then only with small forces.

Another drawback lies in the need for the flywheel, a single-revolution clutch and a brake, which results in an increase of overall size, weight and price of the presses. Since the single-revolution clutch and the brake are fixed to the shaft which transmits the maximum torque, there is a danger of frequency failures, spontaneous engagements etc.

There are also known other types of presses, e.g. hydraulic presses, which compared with power presses of corresponding forces are much more expensive, of lower speed, of more complex design, comprises increasingly complex units and require a much better maintenance, particularly because of leakage through the seals.

OBJECT OF THE INVENTION

It is therefore a general object of this invention to provide a power press for working workpieces by plastic deformation which provides for an increased productivity, workpiece quality, energy efficiency, smaller overall sizes and weight, service reliability, noiselessness and safety in operation.

SUMMARY OF THE INVENTION

This object is achieved by a power press comprising low-inertia motors, controlled by a circuit for regulation and control, connected by means of a low-inertia transmission to a cam in contact with a multiplying lever mechanism, the one end of which is connected to an elastically deformable member and the other end—to a slide carrying the tool.

The profile of the cam has a force-storing section for accumulating energy in the elastically deformable member, connected to a force-delivering or relieving section for delivery of the accumulated energy for working the workpiece. The elastically deformable member is a rod or a spring, of disk-type for example, and is provided with units for regulating its initial deformation, its final deformation, its auxiliary stroke and the quantity of accumulated energy, these units being realized as screw or wedge connections and can comprise an auxiliary soft spring for additional opening of the working component. The cam and the roll are coupled to the elastically deformable member directly, with an independent multiplying lever mechanism, which can be combined with the elastically deformable member and both can be provided with a common elastic support bracket. The power press can be multi-acting and be provided with additional profiled cams, which are in contact with corresponding rolls with multiplying lever mechanisms, connected to the elastically deformable members with units for regulating and working components according to the number of its actions, and the cam/roll combination can be self-stopping.

The power press, in accordance with the invention, shows an improvement of the power factor since the motors do not operate in idle strokes, and reduced wear of the tool as a result of its reduced stroke.

A further advantage lies in the avoiding of technological allowances in closed-die stamping, since the tool can be closed tightly, which together with the smoothness of working improves the quality of the surfaces along the perimeter of shearing (trimming), without this affecting the high speed.

BRIEF DESCRIPTION OF THE DRAWING

In the drawing:

FIG. 1 is a diagram of a single-action power press;

FIG. 2 shows a variant of the elastically deformable member, combined with a multiplying lever mechanism, which is supported by a bracket instead by an articulation joint;

FIG. 3 is a diagram of a single-action press with elastically deformable member in the form of a spring and a wedge unit for regulating the accumulated energy; and FIG. 4 is a diagram of a double-action press with outer and inner cam, one elastically deformable member in the form of a rod load in tension and a second member in the form of a disk-type spring loaded in compression.

SPECIFIC DESCRIPTION

The power press comprises two low-inertia regulable electric motors 1, controlled by a conventional circuit 2 for regulation and control of motor speeds according to a program and by feedback from converting elements for kinematic, power and energetic parameters. The motors 1 drive a low-inertia transmission gearing 3, e.g. a worm 3a meshing with a worm wheel 3b (FIG. 1). To the shaft of the driven component, i.e. the worm wheel, there is fixed a cam 4, profiled by sections, which is in contact with a multiplying lever mechanism 8, connected in its one end to an elastically deformable member and in its other end—to a slide 10 carrying a tool 12. The elastically deformable member 6 is provided with units 7 for regulating its elastic deformation, i.e. of the accumulated and exchange potential energy, which represent screw pairs and can comprise an auxiliary soft spring (not shown in the drawing) for additional opening of the slide 10. The elastically deformable member 6 is coupled to the profiled cam 4 by means of a roll 5 directly (FIG. 3) or by an independent multiplying lever mechanism 8 (FIGS. 1 and 4), or it is combined with the multiplying lever mechanism, with which it is supported in a common elastic support bracket 13 (e.g. of spring steel and shown in FIG. 2). If the multiplying lever mechanism 8 is independent, it is supported on an articulation joint 9 and it is subjected to the action of the forces from the roll 5, the elastically deformable member 6 and the slide 10. The reduction gear and transmission 13 and the motors are mounted upon a support 22.

In FIG. 4 the tool 12 is also connected to an opposite slide 10a, actuated by a multiplying lever mechanism 8a with an articulation 9a, while the press is provided with an additional internal cam 4a with a roller 5a, and the additional elastically deformable member 6a is, for example, a disk-type spring 6a with a unit 7a for regulating its force.

The operation of the power press is as follows:

The press is in initial working position when roll 5 is over the cam 4 in the section for stopping and starting the low-inertia motors 1, the elastically deformable member 6 being maximally deformed (i.e. the roller 5 engages the force-storing portion 20 of the cam), the motors being stopped, while the material to be worked is being delivered.

After starting the low-inertia motors 1, they are accelerated along the profile of cam 4 along a section constant radius in which the elastically deformable member 6 remains in a deformed (force-storing) state. When the section of cam 4 (force delivering section 21) for the release of the accumulated energy is reached, the radius of curvature of which is reduced, the accumulated energy is released by means of the tool 12, fastened to the slide 10, to the workpiece, and the reaction of roll 5 on cam 4 contributes to the acceleration of the motors. The process of energy release from the elastically deformable member 6 is extended with respect to the total duration of the cycle and takes place in accordance with a desired law, determined by the profile of cam 4 and by the boosting of the motors by means of circuit 2. At the end of the process of energy release, the tool 12 is completely closed as shown in FIG. 1. Then follows a section for accumulating energy in the elastically deformable member 6, and during this time the tool 12 releases the workpiece 11, while the motors operate under desired conditions, e.g. a constant torque and speed, determined mainly by the profile of cam 4 and by circuit 2, regardless of the fact that with the increase of the deformation of the elastically deformable member 6 the force which must be applied also increases.

The quantity of the accumulated and exchanged energy can be adjusted according to the requirements of the particular workpieces by means of units 7, 7a with respect to the prestressing of the elastically deformable member 6, 6a as well as with respect to the range of its deformation, and in the case of workpieces which absorb less energy for plastic working the speed can be increased, while in the case of energy-consuming workpieces—it can be reduced. This can be regulated by adjustment, as well as automatically by feedback via circuit 2.

The double-acting press shown in FIG. 4 is suitable for bending or shaping operations. By the addition of a pressing spring (not shown in the figure) to slide 10 (when there is no need for dephased action), or in a variant similar in design to three-action press, it can be used also for operation with three-action tools, for example for precise punching, and to provide the necessary phase deviation of the forces much more simpler than with the known three-action presses.

What we claim is:

1. A power press comprising:
   a press tool adapted to engage a workpiece for plastically deforming same;
   a cam provided with force-storing and force-delivering sections;
   a cam follower engageable with said cam and displaceable in accordance with the contour thereof;
   at least one low-inertia motor operatively connected to said cam for driving same;
   a resilient force-storing member operatively connected to said cam follower and stressed during engagement of said cam follower with said force-storing section of said cam and relieved upon engagement of said cam follower with said force-delivering section of said cam to operate said tool, said force-storing member being operatively connected to said tool; and
   control means connected to said motor for controlling the speed of said motor whereby said control means at least in part controls the rate at which stored force is applied by said force-storing member through said tool to said workpiece.

2. The power press defined in claim 1 wherein said force-storing member includes a rod and a lever connected to said rod and to said tool, said cam follower being provided on said lever, said rod being placed under tension upon engagement of said cam follower with said force-storing section of said cam.

3. The power press defined in claim 1 wherein said force-storing member includes a lever and a stack of disk springs engaged by actuation of said lever, said lever bearing on a tool engaging said workpiece, said cam follower being provided on said lever.

4. The power press defined in claim 1 wherein said cam follower includes a lever engaging said cam and connected to said tool, said lever having a resiliently deformable section forming said resilient member.

* * * * *